US012798089B2

(12) United States Patent
Ikeda et al.

(10) Patent No.: US 12,798,089 B2
(45) Date of Patent: Nov. 17, 2026

(54) ROBOT SYSTEM INCLUDING A ROBOT, A ROBOT CONTROL DEVICE AND A SENSOR AND ROBOT CONTROL DEVICE

(71) Applicant: FANUC CORPORATION, Yamanashi (JP)

(72) Inventors: Yu Ikeda, Yamanashi (JP); Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 62 days.

(21) Appl. No.: 18/682,672

(22) PCT Filed: Sep. 14, 2021

(86) PCT No.: PCT/JP2021/033692
§ 371 (c)(1),
(2) Date: Feb. 9, 2024

(87) PCT Pub. No.: WO2023/042247
PCT Pub. Date: Mar. 23, 2023

(65) Prior Publication Data

US 2024/0359322 A1 Oct. 31, 2024

(51) Int. Cl.
*B25J 9/16* (2006.01)

(52) U.S. Cl.
CPC .................................. *B25J 9/1633* (2013.01)

(58) Field of Classification Search
CPC ...... B25J 9/1633; B25J 9/1676; B25J 13/085; G05B 2219/40201; G05B 2219/40202; G05B 2219/40582
See application file for complete search history.

(56) References Cited

U.S. PATENT DOCUMENTS 10,576,620 B1 * 3/2020 Chou .................... A61F 5/0102
11,839,979 B2 * 12/2023 Rosenlund ............. B25J 9/0081
(Continued)

FOREIGN PATENT DOCUMENTS

JP 2008-183680 A 8/2008
JP 2018-195055 A 12/2018
(Continued)

OTHER PUBLICATIONS

International Search Report issued in PCT/JP2021/033692; mailed Nov. 9, 2021.

*Primary Examiner* — Sze-Hon Kong
(74) *Attorney, Agent, or Firm* — Studebaker Brackett PLLC

(57) ABSTRACT

To record the load exerted on a robot according to changes over time without changing the environment and configuration under which the robot is used. A robot system including a robot, a robot control device that controls the robot, and a sensor that is able to detect information about a force exerted on the robot, the robot control device including a record processing unit that stores a first reference load profile in a storage unit, and a determination unit that determines at least the presence or absence of an external force exerted on the robot according to the first reference load profile and the load exerted on the robot detected by the sensor, and the record processing unit storing the load in the storage unit as a second reference load profile depending on the state of the external force.

15 Claims, 13 Drawing Sheets

(56) References Cited

U.S. PATENT DOCUMENTS

| | | | | |
|---|---|---|---|---|
| 2007/0021868 | A1* | 1/2007 | Nagatsuka | B25J 9/1674 700/245 |
| 2007/0260356 | A1* | 11/2007 | Kock | G05B 13/025 901/30 |
| 2013/0345872 | A1* | 12/2013 | Brooks | B25J 9/1676 700/264 |
| 2014/0156066 | A1* | 6/2014 | Sakano | B25J 9/1612 901/32 |
| 2016/0075031 | A1* | 3/2016 | Gotou | B25J 9/1633 901/34 |
| 2017/0183047 | A1* | 6/2017 | Takagi | B25J 9/1664 |
| 2018/0243899 | A1* | 8/2018 | Hashimoto | A61B 34/37 |
| 2018/0293768 | A1* | 10/2018 | Ooshima | B25J 13/06 |
| 2018/0353253 | A1* | 12/2018 | Bowling | A61B 34/30 |
| 2019/0217468 | A1* | 7/2019 | Ogata | B25J 9/1633 |
| 2020/0262057 | A1* | 8/2020 | Saez | B25J 9/0084 |
| 2020/0384639 | A1* | 12/2020 | Rozo | B25J 9/163 |
| 2021/0178604 | A1* | 6/2021 | Saunders | B25J 15/0616 |
| 2021/0291365 | A1* | 9/2021 | Adachi | B25J 9/1633 |
| 2021/0302940 | A1* | 9/2021 | Nagasaki | B25J 9/1674 |
| 2022/0032460 | A1* | 2/2022 | Hosomi | B25J 9/1638 |
| 2022/0253058 | A1* | 8/2022 | Watanabe | G05D 1/246 |
| 2022/0274262 | A1* | 9/2022 | Nagakari | B25J 13/084 |
| 2022/0388156 | A1* | 12/2022 | Hansen | B25J 13/085 |
| 2022/0402708 | A1* | 12/2022 | Pidaparthi | B65G 57/03 |
| 2022/0416701 | A1* | 12/2022 | Takahashi | H02P 21/143 |
| 2023/0006590 | A1* | 1/2023 | Shimamoto | G05B 17/02 |
| 2023/0063392 | A1* | 3/2023 | Farnioli | B25J 9/1633 |
| 2024/0017427 | A1* | 1/2024 | Hiltz | B25J 9/0084 |
| 2024/0083023 | A1* | 3/2024 | Hamaya | G05B 13/0265 |
| 2024/0299795 | A1* | 9/2024 | Bluman | A63B 21/00181 |
| 2024/0351209 | A1* | 10/2024 | Graabæk | G06N 20/00 |
| 2025/0045630 | A1* | 2/2025 | Hasunuma | G06N 20/00 |

FOREIGN PATENT DOCUMENTS

| | | | |
|---|---|---|---|
| JP | 6526097 | B2 | 6/2019 |
| JP | 2019-209407 | A | 12/2019 |
| JP | 2020-069633 | A | 5/2020 |
| JP | 2021-020287 | A | 2/2021 |

* cited by examiner

ROBOT SYSTEM INCLUDING A ROBOT, A ROBOT CONTROL DEVICE AND A SENSOR AND ROBOT CONTROL DEVICE

TECHNICAL FIELD

The present invention relates to a robot system and a robot control device.

BACKGROUND ART

There has been known a collaborative robot that works in cooperation with a person while ensuring safety by stopping when an external force is detected by a sensor.

For example, there has been known a technique in which in order to not stop a robot due to detection of a load on the robot as an external force in a case where the load fluctuates, the magnitude of force detected by a sensor when one or more operation commands included in an operation program executed for performing a work are executed is stored in association with the operation commands in a state in which no external force acts on the robot and the presence or absence of the external force is determined based on the magnitude of force stored in association with the operation commands and the magnitude of force detected by the sensor when the operation commands of the operation program are executed in a state in which the external force may act on the robot.

CITATION LIST

Patent Document

Patent Document 1: Japanese Patent No. 6526097

DISCLOSURE OF THE INVENTION

Problems to be Solved by the Invention

In Patent Document 1, since the force (load) acting on the robot is detected as an external force when the magnitude of the force (load) is stored, the robot needs to be set to not stop (contact stop) due to external force detection. However, the safety of the collaborative robot cannot be ensured under the setting of preventing the contact stop, and for this reason, the environment/setting needs to be configured to ensure safety, such as installation of a safety fence, as in the case of a normal robot, and this takes time and cost.

Moreover, the stored magnitude of force (load) may change according to, e.g., the environment or season of installation of the robot.

There has been a demand for recording the load acting on the robot according to a temporal change without changing the environment/setting of use of the robot.

Means for Solving the Problems

One aspect of the robot system of the present disclosure is a robot system including a robot, a robot control device that controls the robot, and a sensor capable of detecting information on force acting on the robot. The robot control device includes a recording processing unit configured to store a first reference load profile in a storage unit, and a determination unit configured to determines at least the presence or absence of an external force acting on the robot based on the first reference load profile and a load acting on the robot and detected by the sensor. The recording processing unit stores, in the storage unit, the load as a second reference load profile according to the state of the external force.

One aspect of the robot control device of the present disclosure is a robot control device including a recording processing unit configured to store a first reference load profile in a storage unit, and a determination unit configured to determine at least the presence or absence of an external force acting on a robot based on the first reference load profile and a load acting on the robot and detected by a sensor. The recording processing unit stores, in the storage unit, the load as a second reference load profile according to the state of the external force.

One aspect of the robot control device of the present disclosure is a robot control device including a recording processing unit configured to store a first reference load profile in a storage unit, and a determination unit configured to determine the magnitude of an external force acting on a robot based on the first reference load profile and a load acting on the robot and detected by a sensor. The recording processing unit stores, in the storage unit, the load as a second reference load profile according to an external force determination result.

One aspect of the robot control device of the present disclosure is a robot control device including at least one memory and at least one processor. The at least one memory stores a first reference load profile. The at least one processor is configured to acquire a load acting on a robot and detected by a sensor, determine the magnitude of an external force acting on the robot based on the first reference load profile and the load, and store, in the at least one memory, the load as a second reference load profile according to an external force determination result.

Effects of the Invention

According to one aspect, the load acting on the robot can be recorded according to the temporal change without changing the environment/setting of use of the robot.

PREFERRED MODE FOR CARRYING OUT THE INVENTION

Conventional problems will be briefly described before specific embodiments of a robot system and a robot control device are described.

Figure 14:
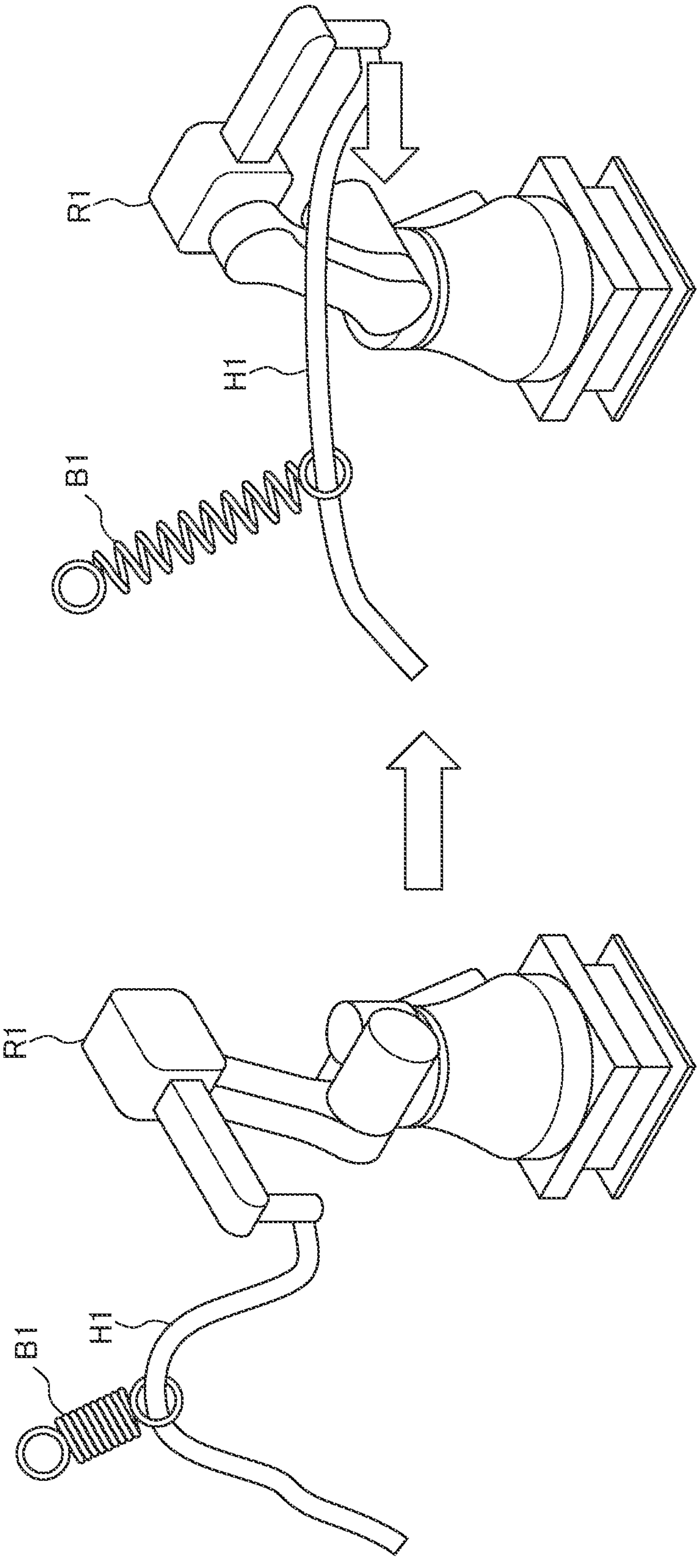
FIG. 14 is a view showing one example of a robot gripping, e.g., a hose or a cable.

FIG. 14 is a view showing one example of a robot that grips, e.g., a hose or a cable. Note that FIG. 14 schematically shows extension and contraction of a spring B1 as force (load) acting on a robot R1.

As shown in FIG. 14, for example, the robot R1 is operated based on a work program in a state in which no external force acts thereon, and the magnitude of force (load), such as tension, of, e.g., a gripped hose H1 is detected by a not-shown sensor and the detected magnitude of force (load) is stored as a reference (hereinafter also referred to as a "reference load").

Figure 15:
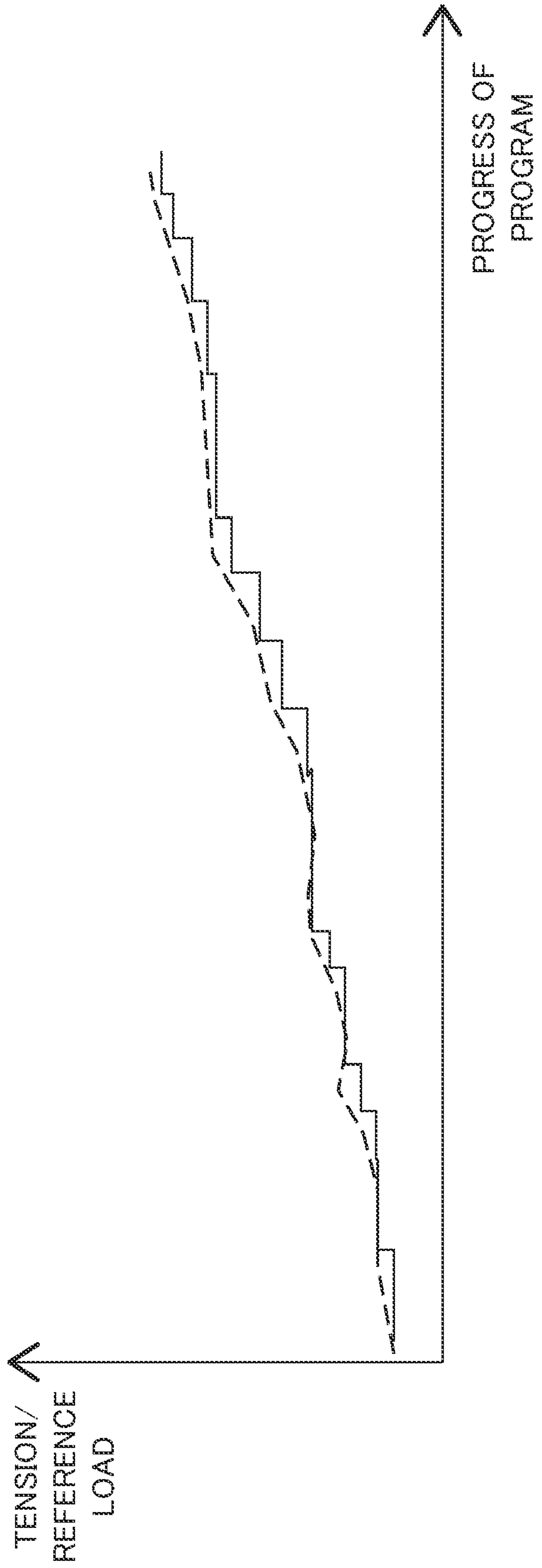
FIG. 15 is a graph showing one example of a recorded reference load.

FIG. 15 is a graph showing one example of the recorded reference load. The vertical axis of FIG. 15 indicates the tension (reference load), and the horizontal axis of FIG. 15 indicates the progress (e.g., time or position) of the work program. FIG. 15 shows the load (indicated by a dashed line) detected by the sensor (not shown) and the reference load (indicated by a solid line) which is the detected load recorded in the form of a step function in association with the progress of the program.

At the time of operation in a state in which the external force may act on the robot R1 (i.e., state in which the robot R1 and, e.g., a person or equipment therearound may contact each other), external force determination on whether or not the absolute value of a difference between the reference load and the load detected by the sensor (not shown) (i.e., an external force acting on the robot R1) exceeds a preset threshold is made with reference to the stored reference load. In a case where the external force exceeds the threshold, it is determined that the robot R1 has contacted, e.g., the person, and the robot R1 is stopped.

Figure 16:
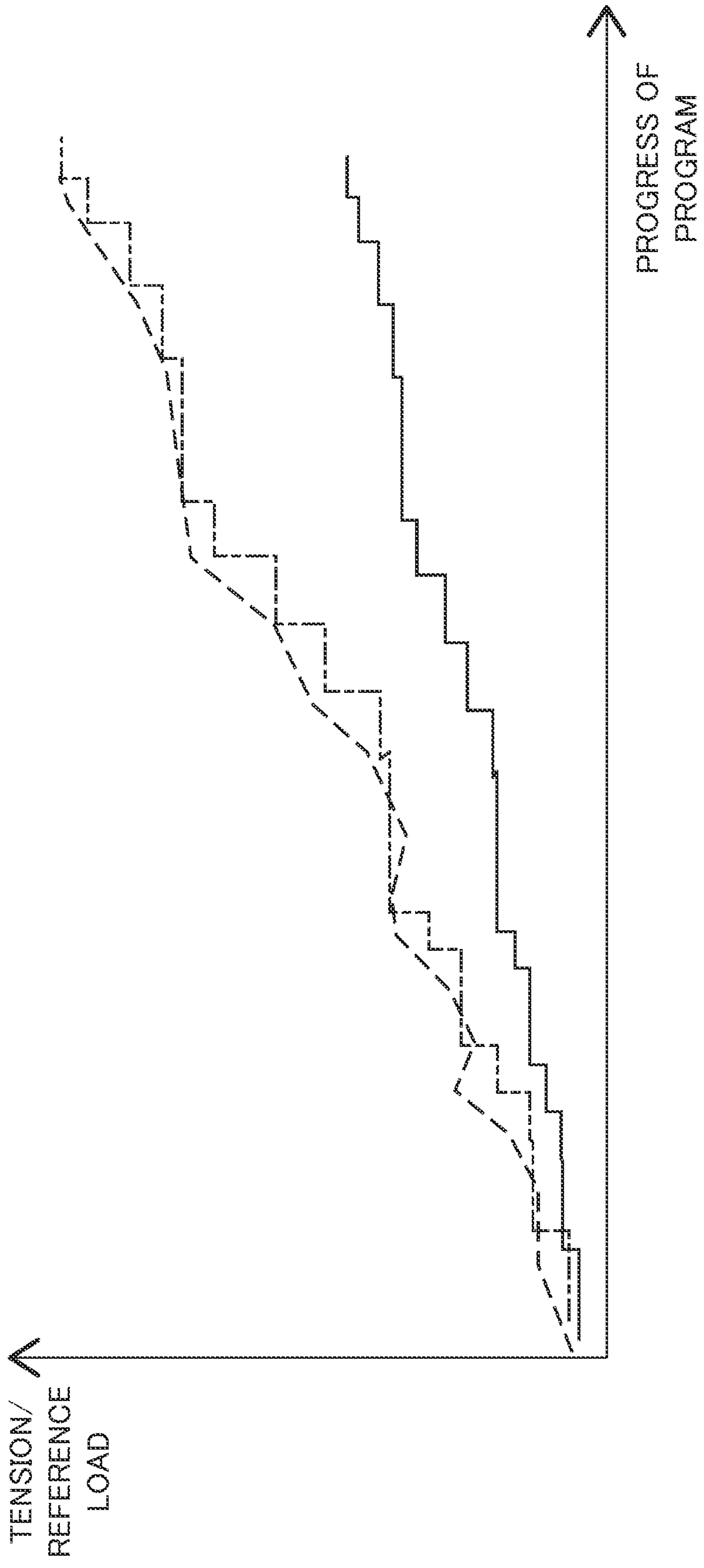
FIG. 16 is a graph showing one example of a temporal change in the reference load.

However, as shown in FIG. 16, the magnitude of force (load) of, e.g., the hose H1 changes over time due to, e.g., deterioration of the hose H1 or fluid in the hose H1 becoming more viscous or solidifying due to low temperature. Note that in FIG. 16, the reference load of FIG. 15 is indicated by a solid line and the force (load) detected by the sensor (not shown) and changing over time is indicated by a dashed line. In this case, the external force calculated from the absolute value of the difference between the reference load of FIG. 15 and the force (load) changing over time exceeds the threshold even if the robot R1 does not contact, e.g., the person. For this reason, the robot R1 is stopped. For this reason, a new reference load (indicated by a chain line) with an association between the tension (load) changing over time and the progress of the program needs to be stored again. However, environment/setting needs to be changed again for such re-storage, and this causes a great burden on a user.

The conventional programs have been briefly described above.

Next, specific first to third embodiments of the robot system and the robot control device will be described in detail with reference to the drawings.

Here, these embodiments are common in a configuration in which an external force due to unintended contact (interference) with, e.g., a surrounding person or equipment is detected from a load acting on a robot.

Note that in the first embodiment, for storage of a reference load (hereinafter also referred to as a "reference load profile") for detecting the external force, the robot is operated in advance based on a work program in an invalid external force detection state in a state in which no unintended interference between the robot and the surrounding thereof is caused, and a change in the load acting on the robot and detected by a sensor is stored as the reference load profile in association with the performed work. On the other hand, the second embodiment is different from the first embodiment in that simulation of the work of the robot is executed in advance based on the work program and a calculated change in the load acting on the robot is stored as the reference load profile. Moreover, the third embodiment is different from the first embodiment and the second embodiment in that the robot is operated based on the work program in a valid external force detection state in a state in which the interference may be caused and a change in the load acting on the robot and detected by the sensor is stored as the reference load profile until the work of the robot is stopped due to erroneous detection of the interference due to a load exceeding a contact stop threshold.

Hereinafter, the first embodiment will be first described in detail, and then, differences of the second and third embodiments from the first embodiment will be mainly described.

First Embodiment

Figure 1:
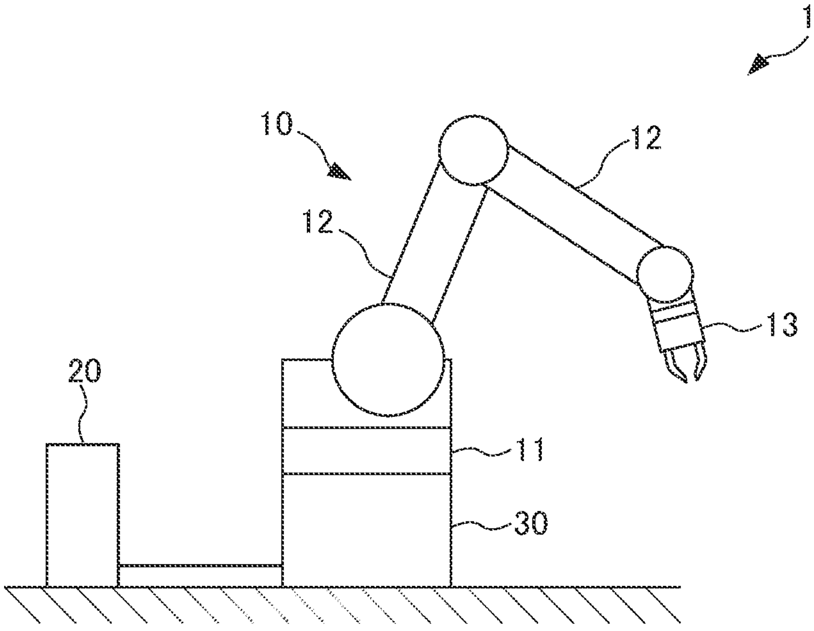
FIG. 1 is a view showing one example of the configuration of a robot system according to a first embodiment.

FIG. 1 is a view showing one example of the configuration of the robot system according to the first embodiment.

As shown in FIG. 1, a robot system 1 is a system operated with a work area shared by a person and a robot 10 without a safety fence, and has the robot 10, a robot control device 20, and a force sensor 30.

The robot 10, the robot control device 20, and the force sensor 30 may be directly connected to each other via a not-shown connection interface. Note that the robot 10, the robot control device 20, and the force sensor 30 may be connected to each other via a not-shown network such as a local area network (LAN) or the Internet. In this case, the robot 10, the robot control device 20, and the force sensor 30 include not-shown communication units for mutual communication via such connection.

The robot 10 is a collaborative robot operated based on control by the later-described robot control device 20. The robot 10 includes a base 11 for rotation about an axis in the vertical direction, movable and rotatable arms 12, and an end effector 13, such as a hand, attached to the tip end of the arm 12 to take out a workpiece.

For example, the force sensor 30 is equipped with the robot 10, and detects the magnitude of force including a load on the robot 10. In a case where the end effector 13 at the tip end of the robot 10 is the hand for gripping the workpiece, the force sensor 30 detects a load including the weight of, e.g., the workpiece gripped by the hand, and detects an external force acting on the robot 10 from, e.g., a person in a case where the person has contacted (interfered with) the robot 10. Note that the force sensor 30 may be provided for each shaft of the robot 10 or may be provided as a torque sensor for each shaft. Moreover, the load to be detected may include correction values for the weight and/or the load due to acceleration and deceleration of the arm 12 and end effector 13 of the robot 10 and the workpiece, and the offset of the force sensor 30.

<Robot Control Device 20>

The robot control device 20 is a device well-known by those skilled in the art for controlling operation of the robot 10. For example, the robot control device 20 generates a control signal by executing a work program generated using an orthogonal coordinate value or each axis value indicating the position of a tip end point of the robot 10 taught by operation of a teaching operation panel (not shown) by a user, and outputs the generated control signal to the robot 10 to operate the robot 10.

Figure 2:
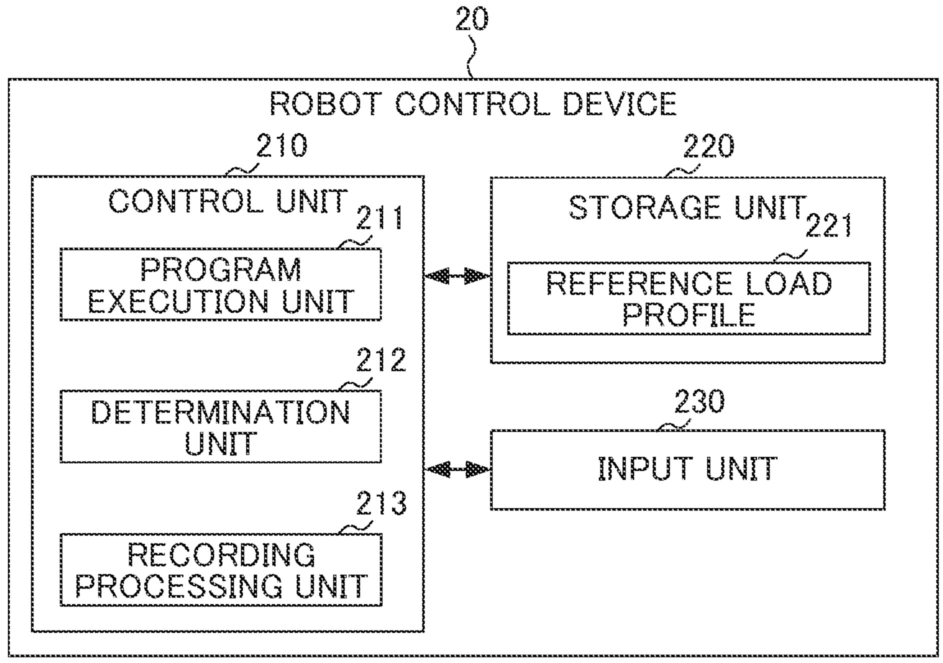
FIG. 2 is a functional block diagram showing a functional configuration example of a robot control device according to the first embodiment.

FIG. 2 is a functional block diagram showing a functional configuration example of the robot control device 20 according to the first embodiment.

As shown in FIG. 2, the robot control device 20 includes a control unit 210, a storage unit 220, and an input unit 230. The control unit 210 includes a program execution unit 211, a determination unit 212, and a recording processing unit 213.

The input unit 230 is, for example, a keyboard or a touch panel arranged on a display unit (not shown) included in a teaching operation board (not shown) or the robot control device 20, and receives input from the user such as a worker.

The storage unit 220 is, for example, a read only memory (ROM) or a hard disk drive (HDD), and stores a reference load profile 221 together with various control programs.

The reference load profile 221 as a first reference load profile is data on a load change, and for example, is data (e.g., reference load indicated by the solid line in FIG. 15) on a change in a load acting on the robot 10 and detected by the force sensor 30 in association with a work performed by the robot 10 after the robot 10 has been operated in advance by the later-described program execution unit 211 based on the work program without stopping due to external force detection in a state in which no unintended interference (contact) between the robot 10 and, e.g., a person or equipment therearound is caused. The reference load profile 221 is stored in the storage unit 220 by the later-described recording processing unit 213.

Note that the reference load profile 221 may be data on a change in a load acting on the robot 10 and detected by the force sensor 30 by the latest operation of the robot 10.

The control unit 210 is a unit well-known by those skilled in the art. The control unit 210 has, for example, a central processing unit (CPU), a ROM, a random access memory (RAM), and a complementary metal-oxide-semiconductor (CMOS) memory, and these components are communicably connected to each other via a bus.

The CPU is a processor that entirely controls the robot control device 20. The CPU reads a system program and an application program saved in the ROM via the bus, and controls the entirety of the robot control device 20 according to the system program and the application program. With this configuration, as shown in FIG. 2, the control unit 210 implements the functions of the program execution unit 211, the determination unit 212, and the recording processing unit 213. The RAM saves various types of data such as temporary calculation data and display data. The CMOS memory is configured as a non-volatile memory backed up by a not-shown battery so that the storage state thereof can be held even when the robot control device 20 is powered off.

For example, when receiving a work program execution instruction from the user via the input unit 230, the program execution unit 211 generates a control signal by executing the work program, and outputs the generated control signal to the robot 10 to operate the robot 10.

For example, the determination unit 212 determines at least the presence or absence of the external force acting on the robot 10 based on the reference load profile 221 and the load detected by the force sensor 30.

Specifically, for example, when the program execution unit 211 receives the work program execution instruction from the user via the input unit 230, the determination unit 212 reads the reference load profile 221 as a temporary reference load profile from the storage unit 220. Then, the program execution unit 211 executes the work program to operate the robot 10. The determination unit 212 corrects the sensor value of the load by subtracting the load of the temporary reference load profile corresponding to the progress of the program from the sensor value of the load detected by the force sensor 30, and calculates the external force acting on the robot 10 in a case where, e.g., a person contacts (interferes with) the robot 10. Note that the sensor value of the load detected by the force sensor 30 may be corrected in advance using correction values for the weight and/or the load due to acceleration and deceleration of the arm 12 and end effector 13 of the robot 10 and the workpiece, and the offset of the force sensor 30.

Figure 3:
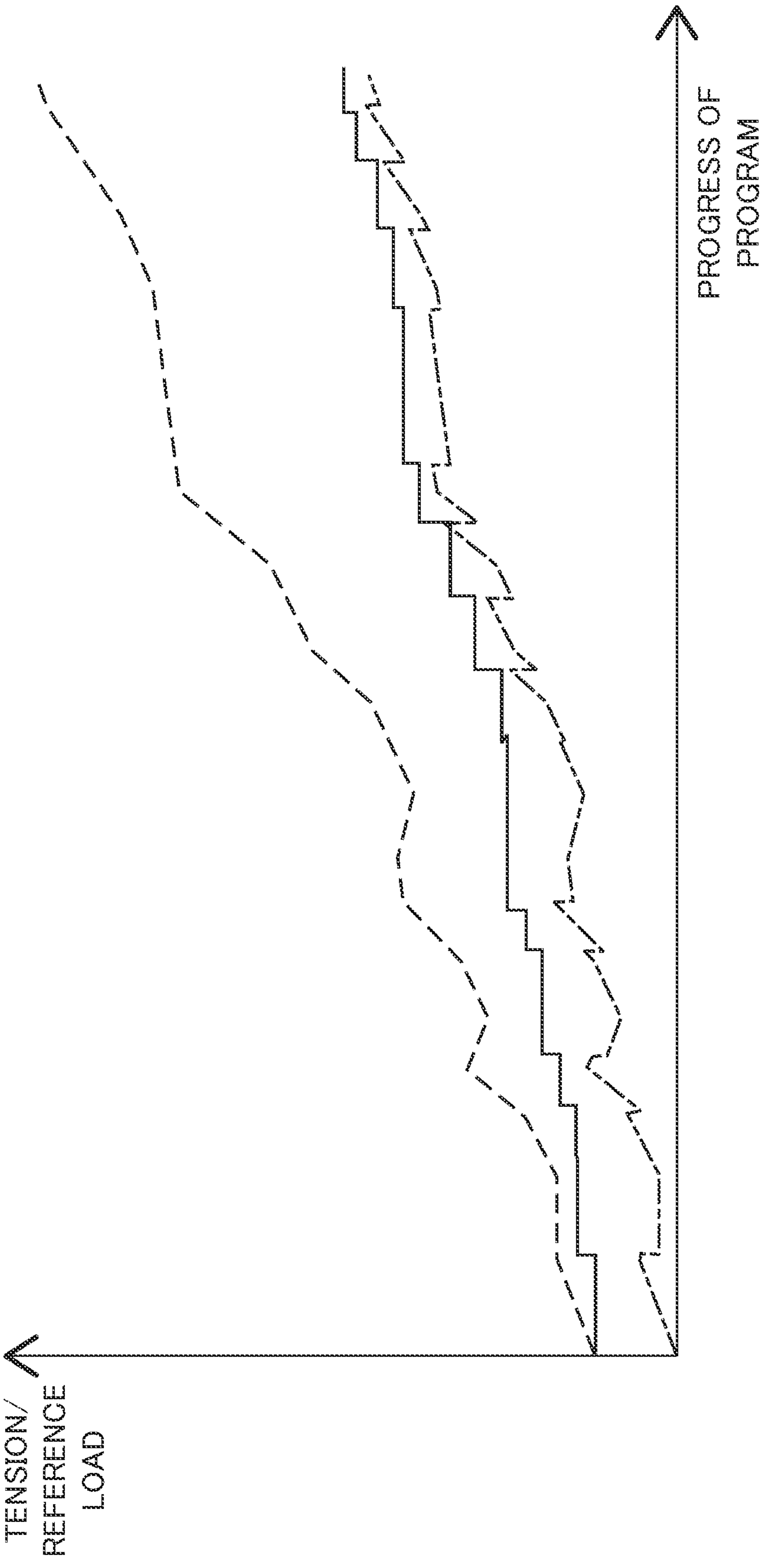
FIG. 3 is a graph showing one example of a load of a temporary reference load profile, a sensor value of a load, and a calculated external force.

FIG. 3 is a graph showing one example of the load of the temporary reference load profile, the sensor value of the load, and the calculated external force. Note that in FIG. 3, the load of the temporary reference load profile is indicated by a solid line, the sensor value of the load is indicated by a dashed line, and the calculated external force is indicated by a chain line.

The determination unit 212 determines whether or not the calculated external force exceeds a predetermined threshold (hereinafter also referred to as a "contact stop threshold") set in advance, and determines that the external force is present in a case where the calculated external force exceeds the contact stop threshold and determines that the external force is absent in a case where the calculated external force is the contact stop threshold or less.

With this configuration, the robot control device 20 can stop the robot 10 in a case where it is determined that the external force is present, and can ensure safety without the safety fence between the robot 10 and, e.g., a person therearound.

The recording processing unit 213 updates, as a new reference load profile 221 (second reference load profile), the total of the load of the temporary reference load profile and the calculated external force in association with the progress (e.g., time or position) of the program, and stores the new reference load profile 221 in the storage unit 220. Note that instead of the above-described total, the recording processing unit 213 may store, as a new reference load profile 221, a pre-corrected sensor value detected by the force sensor 30 or a sensor value corrected using correction values for the weight and/or the load due to acceleration and deceleration of the arm 12 and end effector 13 of the robot 10 and the workpiece, and the offset of the force sensor 30.

Figure 4:
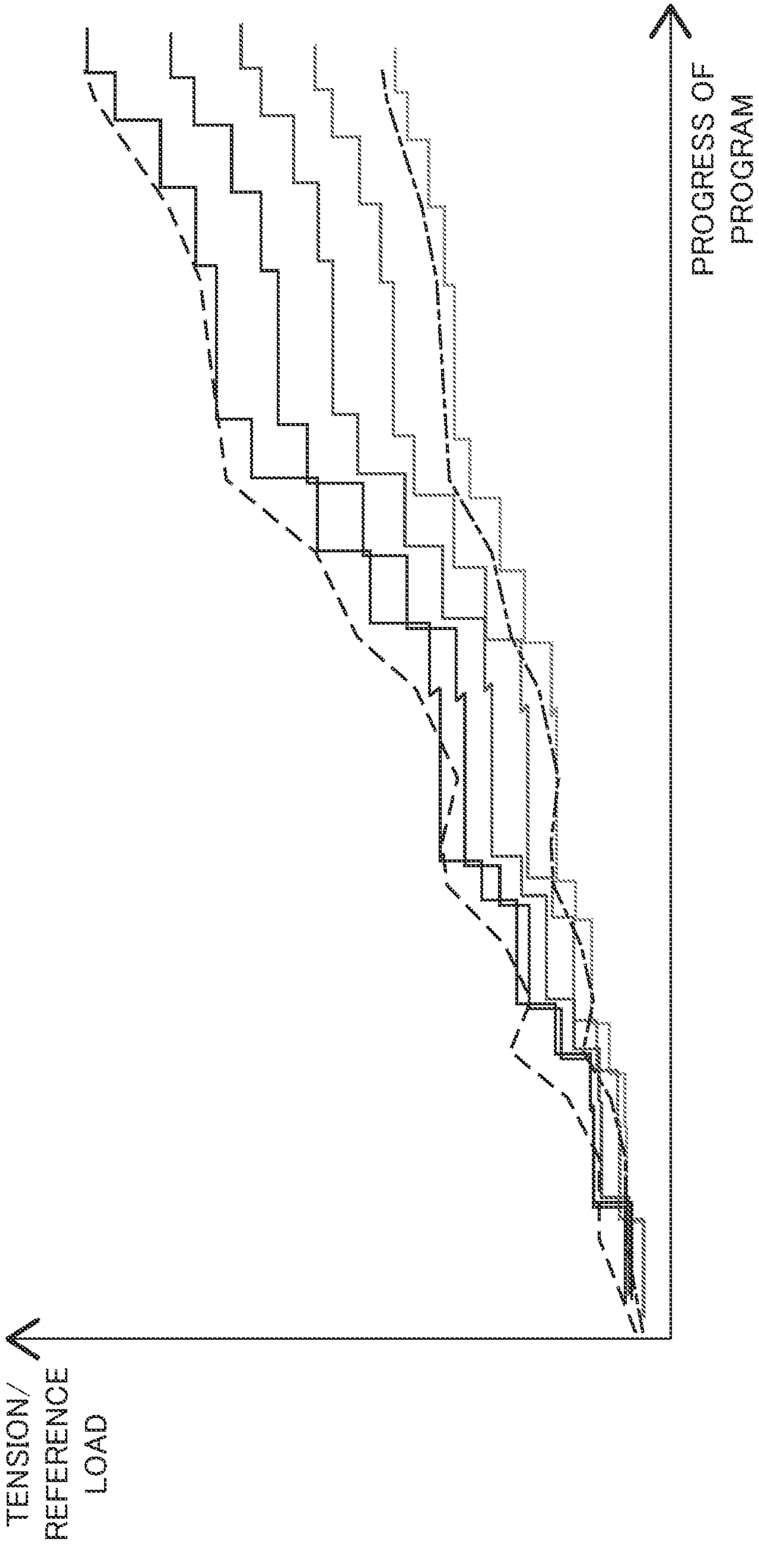
FIG. 4 is a graph showing one example of a temporal change in a reference load profile.

With this configuration, even if the reference load profile gradually changes over time due to, e.g., deterioration of a hose or a cable as shown in FIG. 4 (in FIG. 4, the reference load profile indicated by a solid line changes from the bottom to the top of the vertical axis), the robot control device 20 can respond to the temporal change by storing the reference load profile as necessary under a normal operation condition/operation in a state in which the interference may be caused.

<Determination Processing by Robot Control Device 20>

Next, operation related to determination processing by the robot control device 20 according to the present embodiment will be described.

Figure 5:
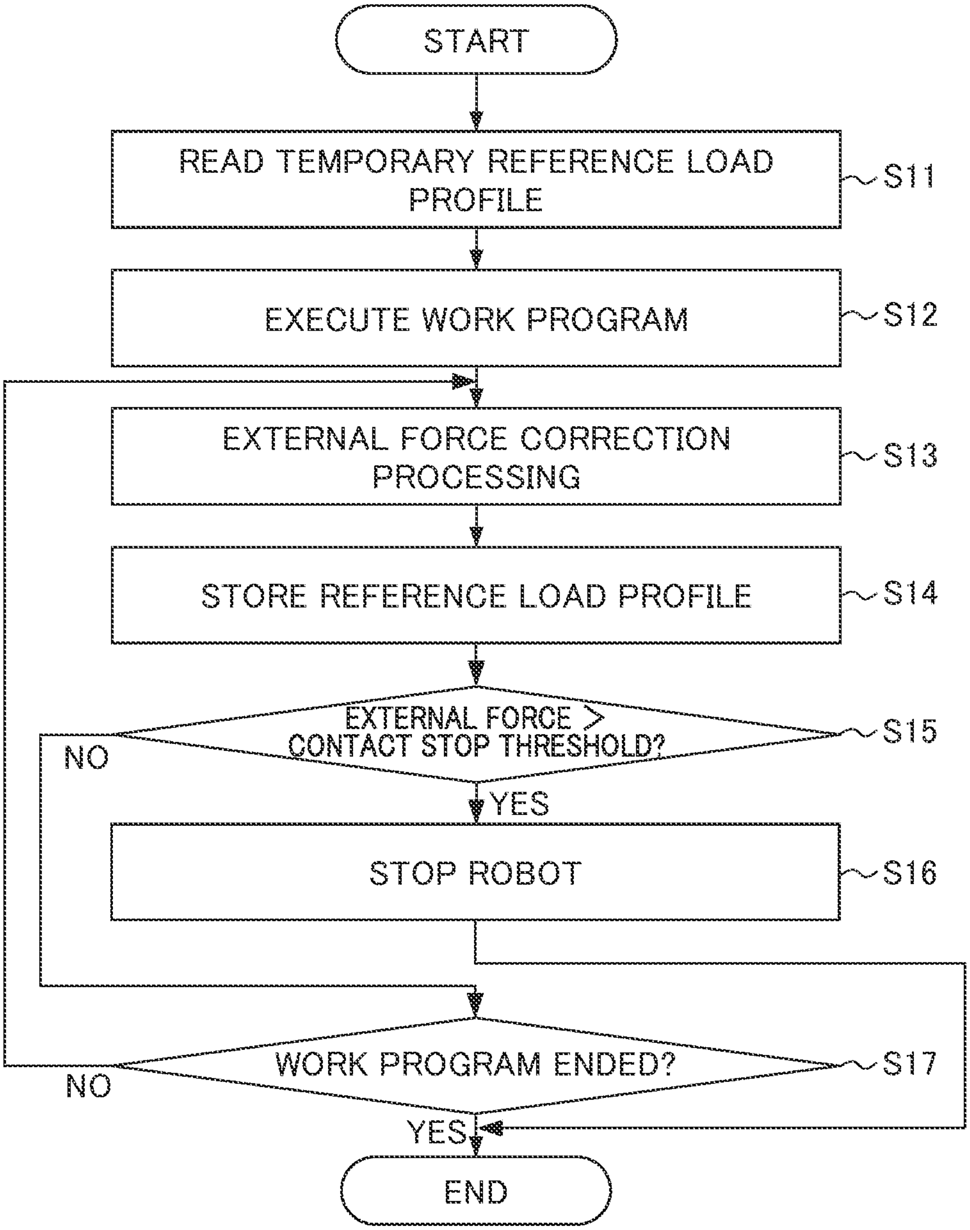
FIG. 5 is a flowchart for describing determination processing by the robot control device.

FIG. 5 is a flowchart for describing the determination processing by the robot control device 20. The flow described here is executed every time the work program execution instruction is received from the user.

In Step S11, when the program execution unit 211 receives the work program execution instruction from the user via the input unit 230, the determination unit 212 reads the reference load profile 221 as the temporary reference load profile from the storage unit 220.

In Step S12, the program execution unit 211 executes the work program to operate the robot 10.

In Step S13, the determination unit 212 corrects the sensor value of the load by subtracting the load of the temporary reference load profile corresponding to the progress of the program from the sensor value of the load detected by the force sensor 30, and calculates the external force acting on the robot 10 in a case where, e.g., a person has contacted (interfered with) the robot 10. Note that the sensor value of the load detected by the force sensor 30 may be corrected in advance using correction values for the weight and/or the load due to acceleration and deceleration of the arm 12 and end effector 13 of the robot 10 and the workpiece, and the offset of the force sensor 30.

In Step S14, the recording processing unit 213 stores, as a new reference load profile 221, the total of the load of the temporary reference load profile and the external force calculated in Step S13 in association with the progress of the program in the storage unit 220. Note that instead of the above-described total, the recording processing unit 213 may store, as a new reference load profile 221, a pre-corrected sensor value detected by the force sensor 30 or a sensor value corrected using correction values for the weight and/or the load due to acceleration and deceleration of the arm 12 and end effector 13 of the robot 10 and the workpiece, and the offset of the force sensor 30.

In Step S15, the determination unit 212 determines whether or not the external force calculated in Step S13 exceeds the contact stop threshold. In a case where the external force exceeds the contact stop threshold, the processing proceeds to Step S16. On the other hand, in a case where the external force is the contact stop threshold or less, the processing proceeds to Step S17.

In Step S16, the determination unit 212 stops the robot 10, and the determination processing ends.

In Step S17, the program execution unit 211 determines whether or not the work program has ended. In a case where the work program has ended, the determination processing ends. On the other hand, in a case where the work program does not end yet, the processing returns to Step S13.

With the above-described configuration, the robot control device 20 according to the first embodiment operates the robot 10 in advance based on the work program in the invalid external force detection state in a state in which no unintended interference between the robot 10 and the surrounding thereof is caused, stores, as the reference load profile 221, the change in the load acting on the robot 10 and detected by the force sensor 30 in association with the performed work, and updates and stores the reference load profile 221 as necessary under the normal operation condition/operation in a state in which the interference may be caused. Thus, the robot control device 20 can record, without causing a great burden on the user, the load acting on the robot 10 according to the temporal change without changing the environment/setting of use of the robot 10.

The first embodiment has been described above.

Second Embodiment

Next, the second embodiment will be described. In the first embodiment, the robot 10 is operated in advance based on the work program in the invalid external force detection state in a state in which no unintended interference between the robot 10 and the surrounding thereof is caused, and the change in the load acting on the robot 10 and detected by the force sensor 30 is stored as the reference load profile in association with the performed work. On the other hand, the second embodiment is different from the first embodiment in that simulation of the work of the robot 10 is executed in advance based on the work program and the calculated change in the load acting on the robot 10 is stored as the reference load profile.

With this configuration, a robot control device 20A of the second embodiment can record the load, which may exceed the contact stop threshold, acting on the robot 10 without changing the environment/setting of use of the robot 10.

Hereinafter, the second embodiment will be described.

Figure 6:
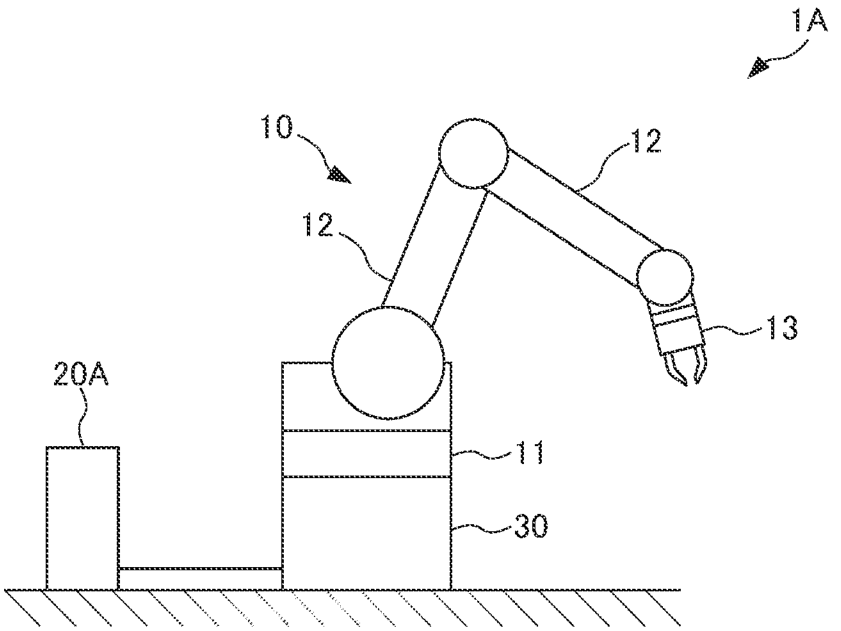
FIG. 6 is a view showing one example of the configuration of a robot system according to a second embodiment.

FIG. 6 is a view showing one example of the configuration of a robot system according to the second embodiment. Note that the same reference numerals are used to represent elements having functions similar to those of the robot system 1 of FIG. 1 and detailed description thereof will be omitted.

As shown in FIG. 6, a robot system 1A has a robot 10, the robot control device 20A, and a force sensor 30.

The robot 10 and the force sensor 30 have functions equivalent to those of the robot 10 and the force sensor 30 in the first embodiment.

<Robot Control Device 20A>

Figure 7:
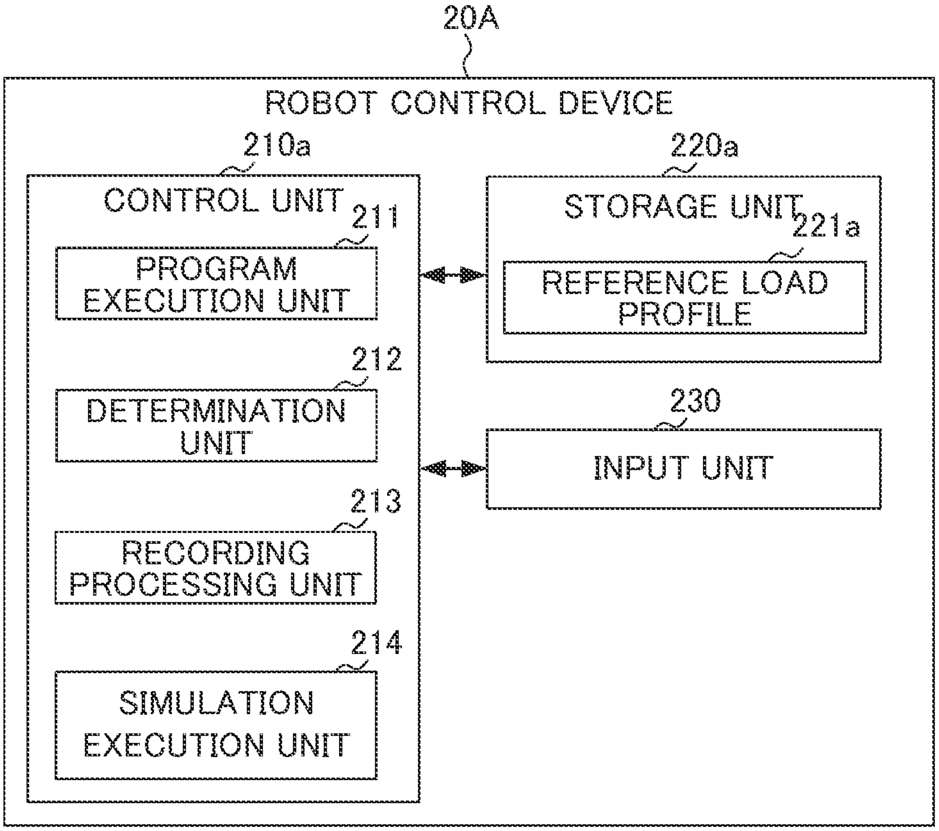
FIG. 7 is a functional block diagram showing a functional configuration example of a robot control device according to the second embodiment.

FIG. 7 is a functional block diagram showing a functional configuration example of the robot control device 20A according to the second embodiment. Note that the same reference numerals are used to represent elements having functions similar to those of the robot control device 20 of FIG. 2 and detailed description thereof will be omitted.

As shown in FIG. 7, the robot control device 20A includes a control unit 210*a*, a storage unit 220*a*, and an input unit 230. The control unit 210*a* includes a program execution unit 211, a determination unit 212, a recording processing unit 213, and a simulation execution unit 214.

The input unit 230 has a function equivalent to that of the input unit 230 in the first embodiment.

The program execution unit 211, the determination unit 212, and the recording processing unit 213 have functions equivalent to those of the program execution unit 211, the determination unit 212, and the recording processing unit 213 in the first embodiment.

As in the storage unit 220 of the first embodiment, the storage unit 220*a* is, for example, a ROM or an HDD, and stores a reference load profile 221*a* together with various control programs.

The reference load profile 221*a* is data on a load change, and for example, is data on a change in a load acting on the robot 10 and calculated by simulation of the work of the robot 10 executed in advance based on a work program by the later-described simulation execution unit 214. The reference load profile 221*a* is stored in the storage unit 220*a* by the recording processing unit 213.

The simulation execution unit 214 executes simple simulation of the work of the robot 10 based on the work program, thereby calculating the change in the load acting on the robot 10.

Figure 8A:
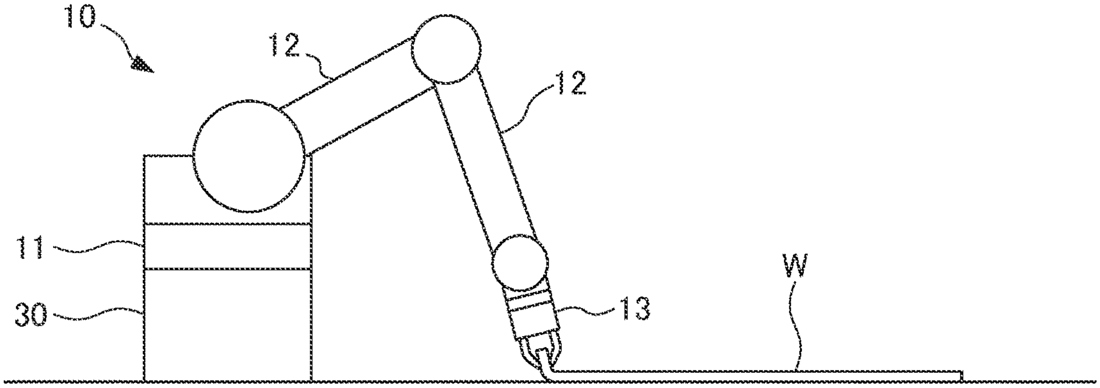
FIG. 8A is a view showing one example of operation of a robot.
Figure 8B:
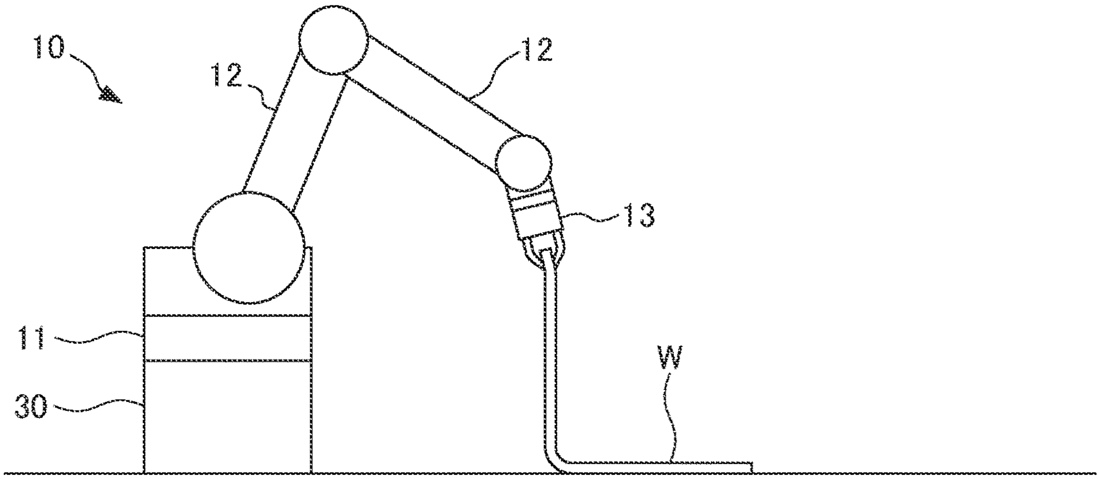
FIG. 8B is a view showing one example of operation of the robot.
Figure 8C:
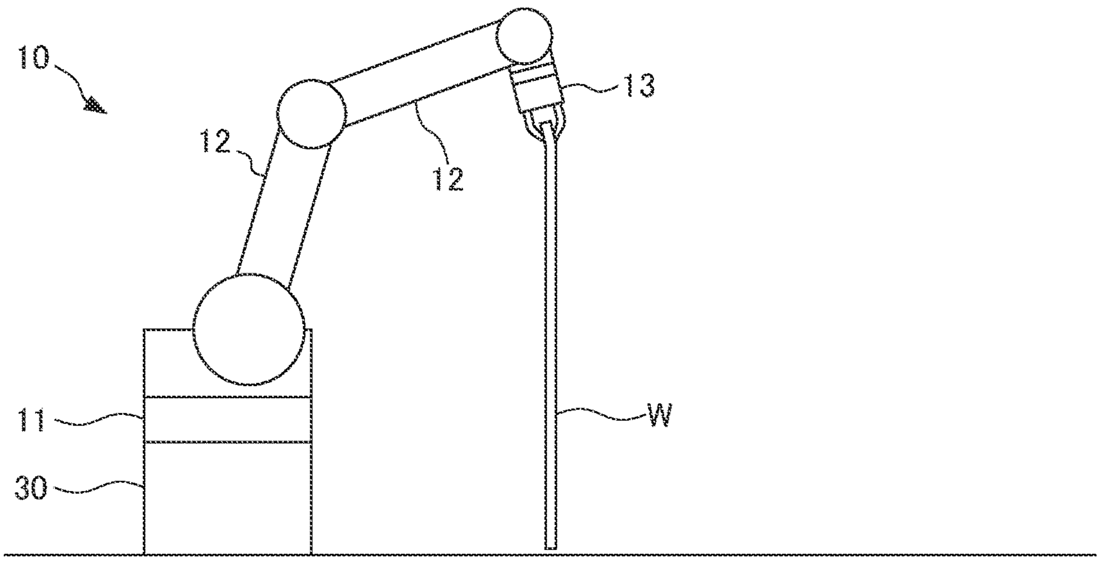
FIG. 8C is a view showing one example of operation of the robot.

Specifically, for example, in a case where a soft long workpiece W such as a hose or a cable is lifted as shown in FIGS. 8A to 8C, the simulation execution unit 214 executes simple simulation for calculating the load acting on the robot 10 according to the length of the lifted workpiece W with, e.g., friction with a floor ignored, thereby calculating the change in the load acting on the robot 10.

Figure 9:
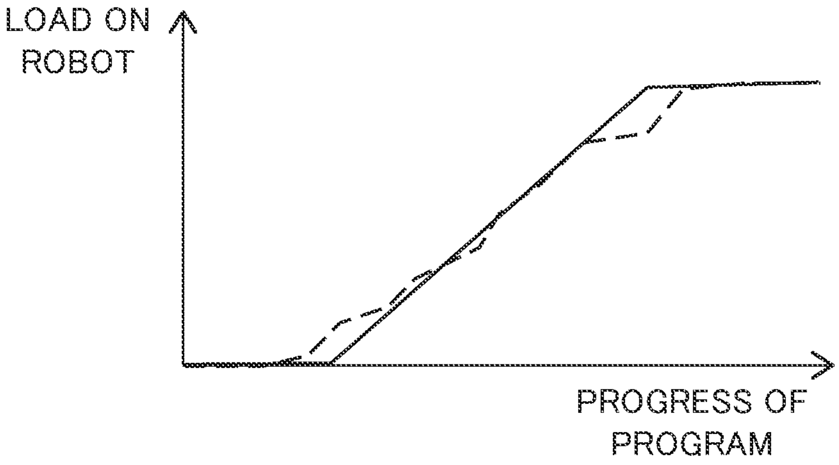
FIG. 9 is a graph showing one example of a calculated change in a load acting on the robot.

FIG. 9 is a graph showing one example of the calculated change in the load acting on the robot 10. In FIG. 9, the calculated load acting on the robot 10 is indicated by a solid line, and a sensor value of a load detected by the force sensor 30 is indicated by a dashed line.

The simulation execution unit 214 stores, as the reference load profile 221*a*, the calculated load change in association with the progress of the program.

Here, in order to not stop the robot 10 shown in FIGS. 8A to 8C due to contact from the start to the end of lifting of the workpiece W, operation of the robot 10 is great, and avoidance of such contact stop needs to be set after safety has been ensured by, e.g., a safety fence. Moreover, accurate simulation of the load in the work of the robot 10 shown in FIGS. 8A to 8C requires a great number of steps and is difficult. On the other hand, the simulation execution unit 214 can easily acquire the reference load profile 221*a* by executing simple simulation.

Note that the simulation execution unit 214 may be configured separately from the robot control device 20A. For example, the robot control device 20A may be configured to take, as the reference load profile 221*a*, a simulation result obtained by another computer.

Note that determination processing by the robot control device 20A is similar to that shown in FIG. 5 and detailed description thereof will be omitted.

With the above-described configuration, the robot control device 20A according to the second embodiment executes simulation of the work of the robot 10 in advance based on the work program, stores the calculated change in the load acting on the robot 10 as the reference load profile 221*a*, and updates and stores the reference load profile 221*a* as necessary under a normal operation condition/operation in a state in which interference may be caused. Thus, the robot control device 20A can record, without causing a great burden on a user, the load, which may exceed the contact stop threshold, acting on the robot 10 without changing the environment/setting of use of the robot 10.

Moreover, the robot control device 20A corrects the sensor value of the load detected by the force sensor 30 according to a temporary reference load profile to calculate an external force, and updates the total of the temporary reference load profile and the calculated external force as a new reference load profile. Thus, in a case where the reference load profile 221*a* can be estimated to some extent, the reference load profile 221*a* can be stored without environmental preparation for storage.

The second embodiment has been described above.

Third Embodiment

Next, the third embodiment will be described. In the first embodiment, the robot 10 is operated in advance based on the work program in the invalid external force detection state in a state in which no unintended interference between the robot 10 and the surrounding thereof is caused, and the change in the load acting on the robot 10 and detected by the force sensor 30 is stored as the reference load profile in association with the performed work. Moreover, in the second embodiment, simulation of the work of the robot 10 is executed in advance based on the work program, and the calculated change in the load acting on the robot 10 is stored as the reference load profile. On the other hand, the third embodiment is different from the first and second embodiments in that the robot 10 is operated based on the work program in a valid external force detection state in a state in which interference may be caused and a change in the load acting on the robot 10 and detected by the force sensor 30 is stored as the reference load profile until the robot 10 is stopped due to erroneous detection of the interference due to the load exceeding the contact stop threshold. Note that erroneous detection of the interference includes stop due to detection of intended contact due to a work. In the case of the intended safe contact, stop of the robot 10 is not originally desired.

Thus, a robot control device 20B of the third embodiment can record the load, which may exceed the contact stop threshold, acting on the robot 10 without changing the environment/setting of use of the robot 10.

Hereinafter, the third embodiment will be described.

Figure 10:
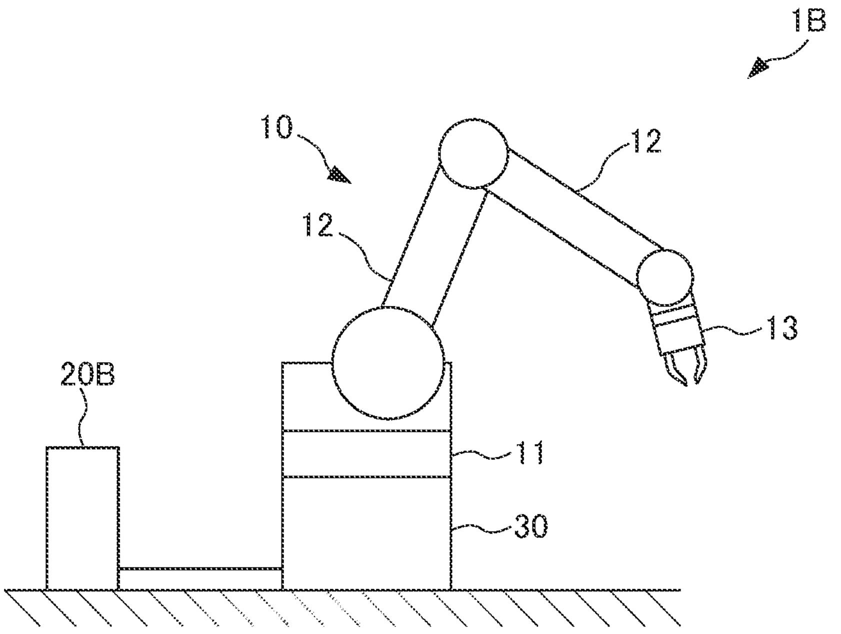
FIG. 10 is a view showing one example of the configuration of a robot system according to a third embodiment.

FIG. 10 is a view showing one example of the configuration of a robot system according to the third embodiment. Note that the same reference numerals are used to represent elements having functions similar to those of the robot system 1 of FIG. 1 and detailed description thereof will be omitted.

As shown in FIG. 10, a robot system 1 has a robot 10, the robot control device 20B, and a force sensor 30.

The robot 10 and the force sensor 30 have functions equivalent to those of the robot 10 and the force sensor 30 in the first embodiment.

<Robot Control Device 20B>

Figure 11:
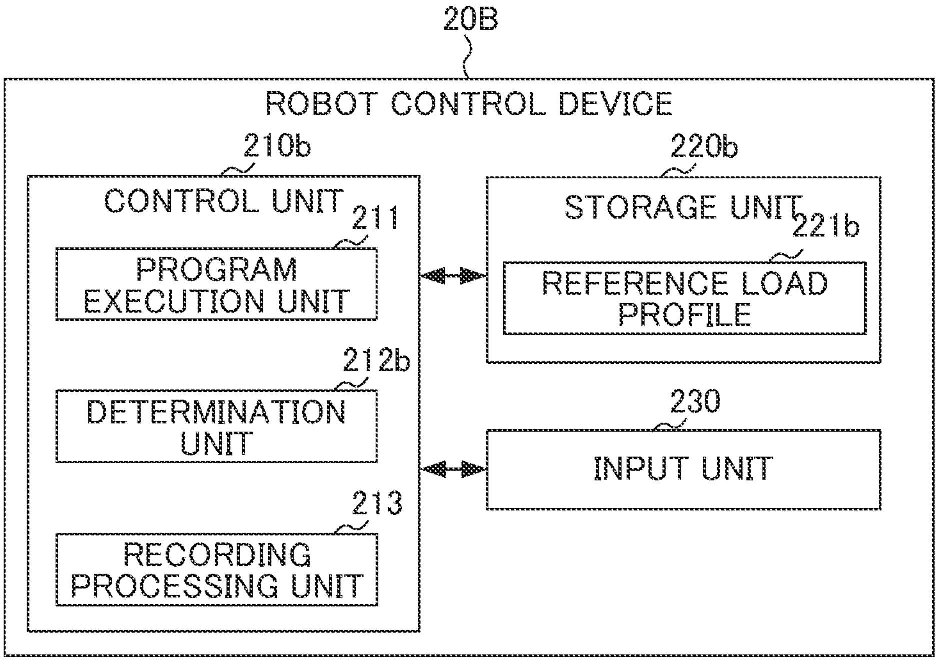
FIG. 11 is a functional block diagram showing a functional configuration example of the robot control device according to the third embodiment.

FIG. 11 is a functional block diagram of a functional configuration example of the robot control device 20B according to the third embodiment. Note that the same reference numerals are used to represent elements having functions similar to those of the robot control device 20 of FIG. 2 and detailed description thereof will be omitted.

As shown in FIG. 11, the robot control device 20B includes a control unit 210*b*, a storage unit 220*b*, and an input unit 230. The control unit 210*b* includes a program execution unit 211, a determination unit 212*b*, and a recording processing unit 213.

The input unit 230 has a function equivalent to that of the input unit 230 in the first embodiment.

The program execution unit 211 and the recording processing unit 213 have functions equivalent to those of the program execution unit 211 and the recording processing unit 213 in the first embodiment.

As in the storage unit 220 of the first embodiment, the storage unit 220*b* is, for example, a ROM or an HDD, and stores a reference load profile 221*b* together with various control programs.

The reference load profile 221*b* is data on a load change, and as described later, is data on a change in a load acting on the robot 10 and detected by the force sensor 30 until the work of the robot 10 is stopped due to erroneous detection of contact (interference) due to a load exceeding the contact stop threshold after the robot 10 has been operated based on a work program by the program execution unit 211 in a state in which contact (interference) between the robot 10 and a person or equipment therearound may be caused in a case where there is no space sufficient for providing, e.g., a safety fence around the robot 10 and it is difficult to prepare safe environment. The reference load profile 221*b* is stored in the storage unit 220*b* by the recording processing unit 213. That is, the reference load profile 221*b* is, for example, data on a load of "0" at the time of the start of determination processing by the robot control device 20B.

For example, in a case where there is no space sufficient for providing, e.g., the safety fence around the robot 10 and it is difficult to prepare the safe environment, the determination unit 212*b* determines, from the start, the magnitude of an external force acting on the robot 10 based on the reference load profile 221*b* and the load detected by the force sensor 30 in a state in which contact (interference) between the robot 10 and, e.g., a person may be caused due to the load exceeding the contact stop threshold.

Specifically, for example, when the program execution unit 211 receives an initial (first) work program execution instruction from a user via the input unit 230, the determination unit 212*b* reads, as a temporary reference load profile, the reference load profile 221*b* with a load of "0" from the storage unit 220*b*. Then, the program execution unit 211 executes the work program to operate the robot 10. The determination unit 212 corrects the sensor value of the load by subtracting the load (e.g., "0") of the temporary reference load profile corresponding to the progress of the program from the sensor value of the load detected by the force sensor 30, and calculates the external force acting on the robot 10 in a case where, e.g., a person has contacted (interfered with) the robot 10.

Figure 12:
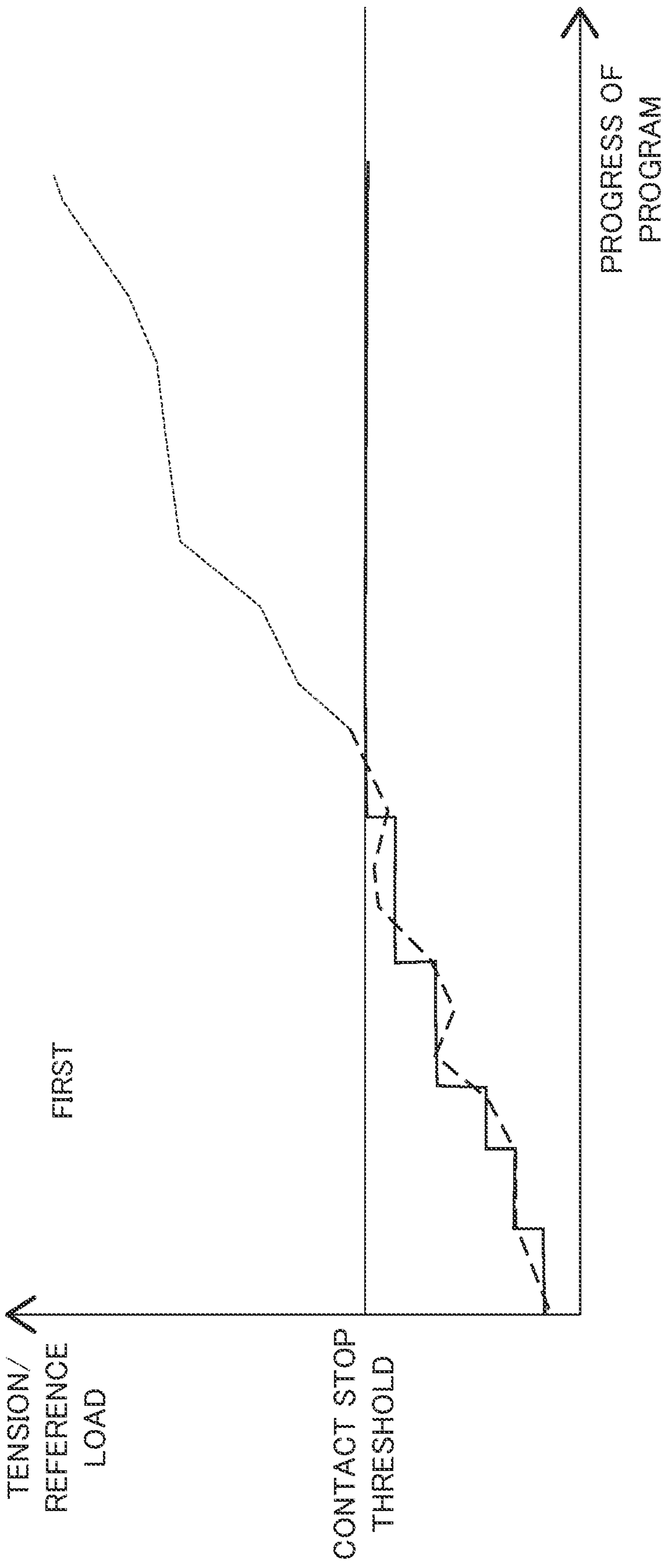
FIG. 12 is a graph showing one example of an external force calculated at the time of first execution of determination processing by the robot control device.

FIG. 12 is a graph showing one example of the external force calculated at the time of first execution of the determination processing by the robot control device 20B. In FIG. 12, the calculated external force, i.e., the sensor value of the load detected by the force sensor 30, is indicated by a dashed line.

The determination unit 212*b* determines whether or not the calculated external force exceeds the contact stop threshold set in advance. The determination unit 212*b* determines that the external force is present in a case where the calculated external force exceeds the contact stop threshold, and stops the robot 10. On the other hand, the determination unit 212*b* determines that the external force is absent in a case where the calculated external force is the contact stop threshold or less.

Then, the recording processing unit 213 updates, as a new reference load profile 221*b*, the total of the load of the temporary reference load profile and the calculated external force in association with the progress (e.g., time or position) of the program as indicated by a solid line in FIG. 12, and stores the reference load profile 221*b* in the storage unit 220*b*. Note that as the load of the newly-stored reference load profile 221*b*, the value corresponding to the sensor value of the load detected by the force sensor 30 is stored while the external force is the contact stop threshold or less, i.e., while the robot 10 does not contact (interfere with) a person or equipment therearound and the value corresponding to the contact stop threshold or the value corresponding to the sensor value at the time of detection is stored after the contact (interference) has been erroneously detected, as shown in FIG. 12.

For example, when the program execution unit 211 receives a second work program execution instruction from the user, the determination unit 212*b* reads, as the temporary reference load profile, the reference load profile 221*b* indicated by the solid line in FIG. 12 from the storage unit 220*b*. Then, the program execution unit 211 executes the work program to operate the robot 10. The determination unit 212*b* corrects the sensor value of the load by subtracting the load of the temporary reference load profile corresponding to the progress of the program from the sensor value of the load detected by the force sensor 30, and calculates the external force acting on the robot 10.

Figure 13:
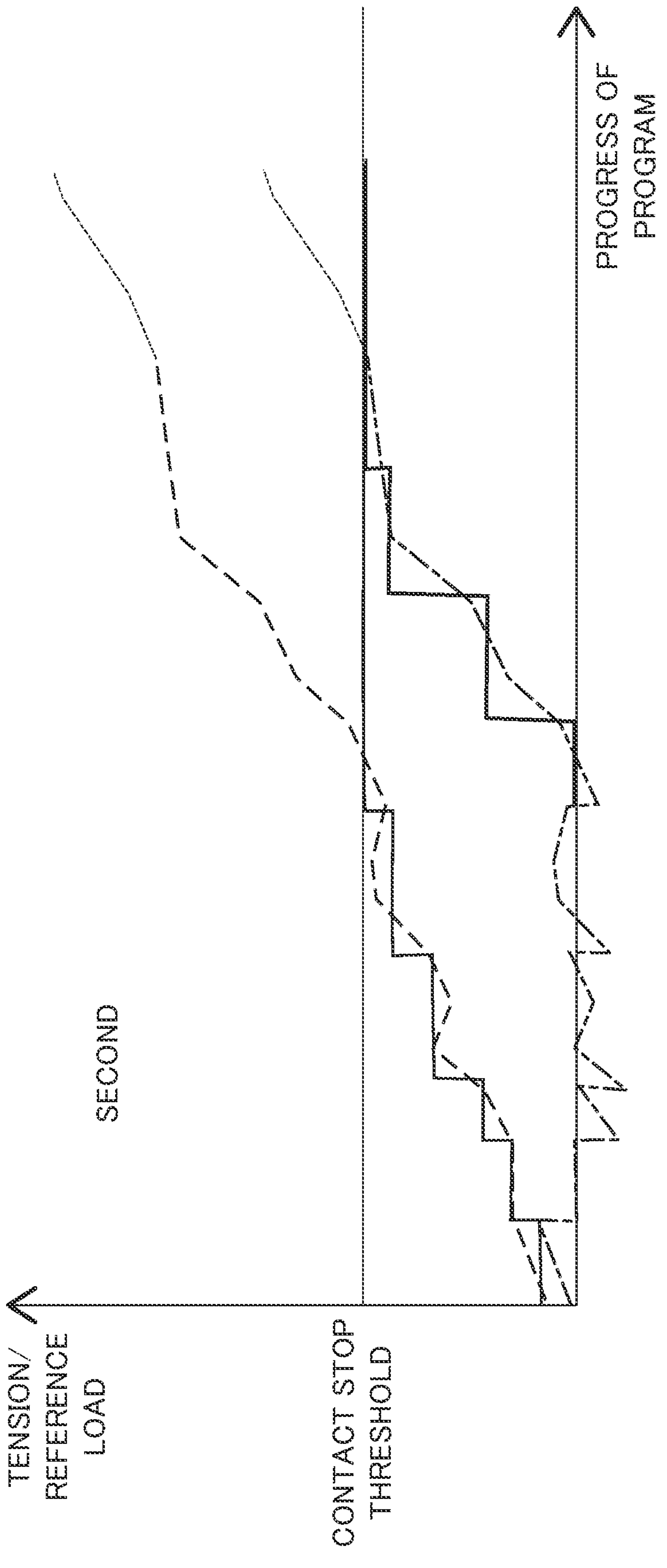
FIG. 13 is a graph showing one example of an external force calculated at the time of second execution of the determination processing by the robot control device.

FIG. 13 is a graph showing one example of the external force calculated at the time of second execution of the determination processing by the robot control device 20B. In FIG. 13, the sensor value of the load detected by the force sensor 30 is indicated by a dashed line, the reference load profile 221*b* shown in FIG. 12 is indicated by a solid line, and the calculated external force is indicated by a chain line. Moreover, in FIG. 13, the external force calculated until second stop after first stop in association with the progress (e.g., time or position) of the program is indicated by a thick solid line.

The recording processing unit 213 updates, as a new reference load profile 221*b*, the total of the load of the temporary reference load profile indicated by the solid line in FIG. 13 and the calculated external force indicated by the thick solid line in association with the progress (e.g., time or position) of the program, and stores the reference load profile 221*b* in the storage unit 220*b*.

The robot control device 20B repeats the determination processing so that the recording processing unit 213 can store the reference load profile 221*b* in the storage unit 220*b* over the entire period of the work program.

Note that the determination processing by the robot control device 20B is similar to that shown in FIG. 5 and detailed description thereof will be omitted.

With the above-described configuration, the robot control device 20B according to the third embodiment operates the robot 10 based on the work program under a normal operation condition/operation in a state in which the interference may be caused, and updates and stores, as the reference load profile 221*b*, the change in the load acting on the robot 10 and detected by the force sensor 30 until the work of the robot 10 is stopped due to erroneous detection of the interference. Thus, the robot control device 20B can record, without causing a great burden on the user, the load, which may exceed the contact stop threshold, acting on the robot 10 without changing the environment/setting of use of the robot 10.

Moreover, even in a case where the load of the reference load profile 221*b* is unknown at the time of first execution of the determination processing, the robot control device 20B repeatedly executes the determination processing so that the reference load profile 221*b* can be stored.

Note that in a case where the external force exceeds the contact stop threshold due to unintended interference and the robot 10 is stopped accordingly, the user needs to remove a cause for such interference and store the reference load profile 221*b* again. The third embodiment has been described above.

Modifications of Third Embodiment

In the third embodiment, the robot control device 20B stops the robot 10 and executes the next determination processing from the beginning in a case where the contact (interference) is determined in the determination processing, but the present invention is not limited thereto. For example, the robot control device 20B may resume the processing from the stop position of the program in the latest determination processing, or may perform the processing from a program operation point before the stop position.

Alternatively, the robot control device 20B may resume the determination processing from the stop position of the robot 10 in a case where the user confirms safety (e.g., a state of the robot 10 and a person not actually contacting each other or a state of no external force other than the work being generated) and inputs safety confirmation and an instruction for resuming the work of the robot 10 via the input unit 230 after the robot 10 has been stopped due to the contact (interference) determined in the determination processing.

The first embodiment, the second embodiment, and the third embodiment have been described above, but the robot systems 1, 1A, 1B and the robot control devices 20, 20A, 20B are not limited to those of the above-described embodiments, and changes, modifications, etc. can be made within such a range that the object can be achieved.

<Modification 1>

In the first embodiment, the second embodiment, and the third embodiment, the robot control device 20, 20A, 20B stops the robot 10 in a case where the calculated external force exceeds the contact stop threshold, but the present invention is not limited thereto. For example, the robot control device 20, 20A, 20B may stop the robot 10, and notify the user of such stop.

<Modification 2>

For example, in the first embodiment, the second embodiment, and the third embodiment, the robot control device 20, 20A, 20B stores, as the reference load profile, any of the data on the change in the load acting on the robot 10 and detected by the force sensor 30 in association with the performed work after the robot 10 has been operated in advance based on the work program in a state in which no unintended interference between the robot 10 and the surrounding thereof is caused, the data on the change in the load acting on the robot 10 and calculated in advance by execution of simulation of the work of the robot 10 based on the work program, and the data on the change in the load acting on the robot 10 and detected by the force sensor 30 until the work of the robot 10 is stopped due to erroneous detection of the interference after the robot 10 has been operated based on the work program in a state in which the interference may be caused, but the present invention is not limited thereto.

For example, the robot control device 20, 20A, 20B may store, as the reference load profile, a combination of any two or more of a reference load profile storing the change in the load acting on the robot 10 and detected by the force sensor 30 in association with the performed work after the robot 10 has been operated in advance based on the work program in a state in which no unintended interference between the robot 10 and the surrounding thereof is caused, a reference load profile storing the change in the load acting on the robot 10 and calculated in advance by execution of simulation of the work of the robot 10 based on the work program, a reference load profile storing the change in the load acting on the robot 10 and detected by the force sensor 30 until the work of the robot 10 is stopped due to erroneous detection of the interference after the robot 10 has been operated based on the work program in a state in which the interference may be caused, and a reference load profile storing the load at the time of erroneous detection.

Note that each function of the robot systems 1, 1A, 1B and the robot control devices 20, 20A, 20B according to the first embodiment, the second embodiment, and the third embodiment may be implemented by hardware, software, or a combination thereof. Here, implementation by the software means implementation by reading and execution of a program by a computer.

The program can be stored using various types of non-transitory computer readable media and be supplied to the computer. The non-transitory computer readable media include various types of tangible storage media. Examples of the non-transitory computer readable media include magnetic recording media (e.g., a flexible disk, a magnetic tape, and a hard disk drive), magnetic optical recording media (e.g., a magnetic optical disk), a CD-read only memory (CD-ROM), a CD-R, a CD-R/W, and semiconductor memories (e.g., a mask ROM, a programmable ROM (PROM), an erasable PROM (EPROM), a flash ROM, and a RAM). The program may be supplied to the computer by means of various types of transitory computer readable media. Examples of the transitory computer readable media include an electric signal, an optical signal, and an electromagnetic wave. The transitory computer readable medium can supply the program to the computer via a wired communication path such as an electric wire or an optical fiber or a wireless communication path.

Note that the steps of describing the program recorded in the recording medium include not only processing performed in chronological order, but also processing executed in parallel or separately.

In other words, the robot system and the robot control device of the present disclosure may include various embodiments having the following configurations.

(1) The robot system 1 of the present disclosure is the robot system including the robot 10, the robot control device 20 that controls the robot 10, and the force sensor 30 capable of detecting the information on the force acting on the robot 10. The robot control device 20 includes the recording processing unit 213 configured to store the reference load profile 221 in the storage unit 220, and the determination unit 212 configured to determine at least the presence or absence of the external force acting on the robot 10 based on the reference load profile 221 and the load acting on the robot 10 and detected by the force sensor 30. The recording processing unit 213 stores, in the storage unit 220, the load as the reference load profile 221 according to the state of the external force.

According to the robot system 1, the load acting on the robot 10 can be recorded according to the temporal change without changing the environment/setting of use of the robot 10, or can be recorded in a case where the load acting on the robot 10 may be determined as the external force.

(2) In the robot system 1 according to (1), the reference load profile 221 as the second reference load profile may be the total of the reference load profile 221 as the first reference load profile and the external force.

With this configuration, the robot system 1 can update the reference load profile.

(3) In the robot system 1B according to (1) or (2), in a case where the determination unit 212*b* determines that the external force is the predetermined threshold or less, the recording processing unit 213 may store the load as the reference load profile 221 in the storage unit.

With this configuration, the robot system 1B can record the load while the robot 10 does not contact (interfere with) the surrounding thereof.

(4) In the robot system 1 according to any one of (1) to (3), in a case where the determination unit 212 determines that the external force is greater than the predetermined threshold, operation of the robot may be stopped.

With this configuration, the robot system 1 can safely operate the robot 10.

(5) In the robot system 1 according to any one of (1) to (4), instead of the reference load profile 221, the recording processing unit 213 may store, as the new reference load profile 221, the temporary reference load profile in the storage unit 220.

With this configuration, the robot system 1 can update the reference load profile.

(6) In the robot system 1 according to (1), the reference load profile 221 may be the reference load profile storing the change in the load in association with the performed work after the robot 10 has been operated in advance based on the work program in a state in which no unintended interference between the robot 10 and the surrounding thereof is caused.

With this configuration, the robot system 1 can store the accurate reference load profile 221 from the beginning.

(7) In the robot system 1A according to (1), the reference load profile 221*a* may be the reference load profile storing the change in the load acting on the robot 10 and calculated in advance by execution of simulation of the work of the robot 10 based on the work program.

With this configuration, the robot system 1A can store the reference load profile 221*a* without environmental preparation for storage.

(8) In the robot system 1B according to (1), the reference load profile 221*b* may be the reference load profile storing the change in the load until the robot 10 is stopped due to erroneous detection of the unintended interference between the robot 10 and the surrounding thereof after the robot 10 has been operated based on the work program.

With this configuration, the robot system 1B can store the reference load profile 221*b* even in a case where there is no space sufficient for providing, e.g., the safety fence around the robot 10 and it is difficult to prepare the safe environment.

(9) In the robot system 1B according to (1), the reference load profile 221*b* may be the reference load profile storing the reference load profile storing the change in the load until the robot 10 is stopped due to erroneous detection of the unintended interference between the robot 10 and the surrounding thereof after the robot 10 has been operated based on the work program and the load acting on the robot 10 at the time of erroneous detection.

With this configuration, the robot system 1B can provide advantageous effects similar to those of (8).

(10) The robot system 1B according to (8) or (9) may further include the input unit 230. In a case where after the stop of the robot 10, it is confirmed that the stop is due to erroneous detection, the safety of the robot 10 is confirmed, and the input unit 230 receives the instruction for resuming the work of the robot 10, the determination unit 212*b* may correct, using the reference load profile 221*b*, the load acting on the robot 10 after the stop.

With this configuration, the robot system 1B can store the reference load profile 221*b* by repeatedly executing the determination processing.

(11) In the robot system 1, 1A, 1B according to (1), the reference load profile may be a combination of any two or more of the reference load profile 221 storing the change in the load in association with the performed work after the robot 10 has been operated in advance based on the work program in a state in which no unintended interference between the robot 10 and the surrounding thereof is caused, the reference load profile 221*a* storing the change in the load acting on the robot 10 and calculated in advance by execution of simulation of the work of the robot 10 based on the work program, the reference load profile 221*b* storing the change in the load until the robot 10 is stopped due to erroneous detection of the unintended interference after the robot 10 has been operated based on the work program, and the reference load profile storing the load at the time of erroneous detection.

With this configuration, the robot system 1, 1A, 1B is applicable to various types of environment/setting of arrangement of the robot 10.

(12) In the robot system 1, 1A, 1B according to any one of (1) to (11), the load may include a correction value for at least one of a weight and/or a load due to acceleration and deceleration of a mechanism of the robot 10, a weight and/or a load due to acceleration and deceleration of an end effector 13 of the robot including a hand, and a weight and/or a load due to acceleration and deceleration of a workpiece held by the hand, and an offset of the force sensor 30.

(13) The robot control device 20 of the present disclosure includes the recording processing unit 213 configured to store the reference load profile 221 in the storage unit 220, and the determination unit 212 configured to determine at least the presence or absence of the external force acting on the robot 10 based on the reference load profile 221 and the load acting on the robot 10 and detected by the force sensor 30. The recording processing unit 213 stores, in the storage unit 220, the load as the reference load profile 221 according to the state of the external force.

According to the robot control device 20, advantageous effects similar to those of (1) can be provided.

(14) The robot control device 20B of the present disclosure includes the recording processing unit 213 configured to store the reference load profile 221*b* in the storage unit 220*b*, and the determination unit 212*b* configured to determine the magnitude of the external force acting on the robot 10 based on the reference load profile 221*b* and the load acting on the robot 10 and detected by the force sensor 30. The recording processing unit 213 stores, in the storage unit 220*b*, the load as the reference load profile 221*b* according to the external force determination result.

According to the robot control device 20B, advantageous effects similar to those of (1) can be provided.

(15) The robot control device 20 of the present disclosure includes at least one memory (storage unit 220) and at least one processor (control unit 210). The at least one memory stores the reference load profile 221. The at least one processor is configured to acquire the load acting on the robot 10 and detected by the force sensor 30, determine the magnitude of the external force acting on the robot 10 based on the reference load profile 221 and the load, and store, in the at least one memory, the load as the reference load profile 221 according to the external force determination result.

According to the robot control device 20, advantageous effects similar to those of (1) can be provided.

EXPLANATION OF REFERENCE NUMERALS

1, 1A, 1B Robot System
10 Robot
20, 20A, 20B Robot Control Device
210, 210*a*, 210*b* Control Unit (Processor)
211 Program Execution Unit
212, 212*b* Determination Unit
213 Recording Processing Unit
214 Simulation Execution Unit
220, 220*a*, 220*b* Storage Unit (Memory)
221, 221*a*, 221*b* Reference Load Profile
30 Force Sensor

The invention claimed is:

1. A robot system comprising:

a robot;

a robot control device that controls the robot; and a sensor capable of detecting information on a force acting on the robot, wherein the robot control device includes a recording processing unit configured to store a first reference load profile in a storage unit, and a determination unit configured to determine at least a presence or absence of an external force acting on the robot based on the first reference load profile read from the storage unit when an execution instruction of a program is received and a load acting on the robot and detected by the sensor during the execution of the program, wherein the recording processing unit stores, in the storage unit, the load as a second reference load profile in association with the progress of the program according to a state of the external force, and wherein the robot is controlled by the robot control device according to temporal change based on the second reference load profile and the load acting on the robot detected by the sensor.

2. The robot system according to claim 1, wherein the second reference load profile is a total of the first reference load profile and the external force.

3. The robot system according to claim 1, wherein in a case where the determination unit determines that the external force is a predetermined threshold or less, the recording processing unit stores the load as the second reference load profile in the storage unit.

4. The robot system according to claim 1, wherein in a case where the determination unit determines that the external force is greater than the predetermined threshold, operation of the robot is stopped.

5. The robot system according to claim 1, wherein instead of the first reference load profile, the recording processing unit stores, as a new reference load profile, the second reference load profile in the storage unit.

6. The robot system according to claim 1, wherein the first reference load profile is a reference load profile storing a change in the load in association with a performed work after the robot has been operated in advance based on a work program in a state in which no unintended interference between the robot and a surrounding thereof is caused.

7. The robot system according to claim 1, wherein the first reference load profile is a reference load profile storing a change in a load acting on the robot and calculated in advance by execution of simulation of a work of the robot based on a work program.

8. The robot system according to claim 1, wherein the first reference load profile is a reference load profile storing a change in the load until the robot is stopped due to erroneous detection of unintended interference between the robot and a surrounding thereof after the robot has been operated based on a work program.

9. The robot system according to claim 8, further comprising:

an input unit, wherein in a case where after stop of the robot, it is confirmed that the stop is due to the erroneous detection, safety of the robot is confirmed, and the input unit receives an instruction for resuming a work of the robot, the determination unit corrects, using the first reference load profile, a load acting on the robot after the stop.

10. The robot system according to claim 1, wherein the first reference load profile is a reference load profile storing a change in the load until the robot is stopped due to erroneous detection of unintended interference between the robot and a surrounding thereof after the robot has been operated based on a work program and a load acting on the robot at a time of the erroneous detection.

11. The robot system according to claim 1, wherein the first reference load profile is a combination of any two or more of a reference load profile storing a change in the load in association with a performed work after the robot has been operated in advance based on a work program in a state in which no unintended interference between the robot and a surrounding thereof is caused, a reference load profile storing a change in a load acting on the robot and calculated in advance by execution of simulation of a work of the robot based on the work program, a reference load profile storing a change in the load until the robot is stopped due to erroneous detection of the unintended interference after the robot has been operated based on the work program, and a reference load profile storing the load at a time of the erroneous detection.

12. The robot system according to claim 1, wherein the load includes a correction value for at least one of a weight and/or a load due to acceleration and deceleration of a mechanism of the robot, a weight and/or a load due to acceleration and deceleration of an end effector of the robot including a hand, and a weight and/or a load due to acceleration and deceleration of a workpiece held by the hand, and an offset of the sensor.

13. A robot control device comprising:

a recording processing unit configured to store a first reference load profile in a storage unit; and a determination unit configured to determine at least a presence or absence of an external force acting on a robot based on the first reference load profile read from the storage unit when an execution instruction of a program is received and a load acting on the robot and detected by a sensor during the execution of the program, wherein the recording processing unit stores, in the storage unit, the load as a second reference load profile in association with the progress of the program according to a state of the external force, and wherein the robot is controlled by the robot control device according to temporal change based on the second reference load profile and the load acting on the robot detected by the sensor.

14. A robot control device comprising:

a recording processing unit configured to store a first reference load profile in a storage unit; and a determination unit configured to determine a magnitude of an external force acting on a robot based on the first reference load profile read from the storage unit when an execution instruction of a program is received and a load acting on the robot and detected by a sensor during the execution of the program, wherein the recording processing unit stores, in the storage unit, the load as a second reference load profile in association with the progress of the program according to an external force determination result, and wherein the robot is controlled by the robot control device according to temporal change based on the second reference load profile and the load acting on the robot detected by the sensor.

15. A robot control device comprising:

at least one memory; and at least one processor, wherein the at least one memory stores a first reference load profile, and the at least one processor is configured to read the first reference load profile from the at least one memory when an execution instruction of a program is received, acquire a load acting on a robot and detected by a sensor during the execution of the program, determine a magnitude of an external force acting on the robot based on the first reference load profile and the load, and store, in the at least one memory, the load as a second reference load profile in association with the progress of the program according to an external force determination result, wherein the robot is controlled by the robot control device according to temporal change based on the second reference load profile and the load acting on the robot detected by the sensor.

* * * * *